United States Patent Office.

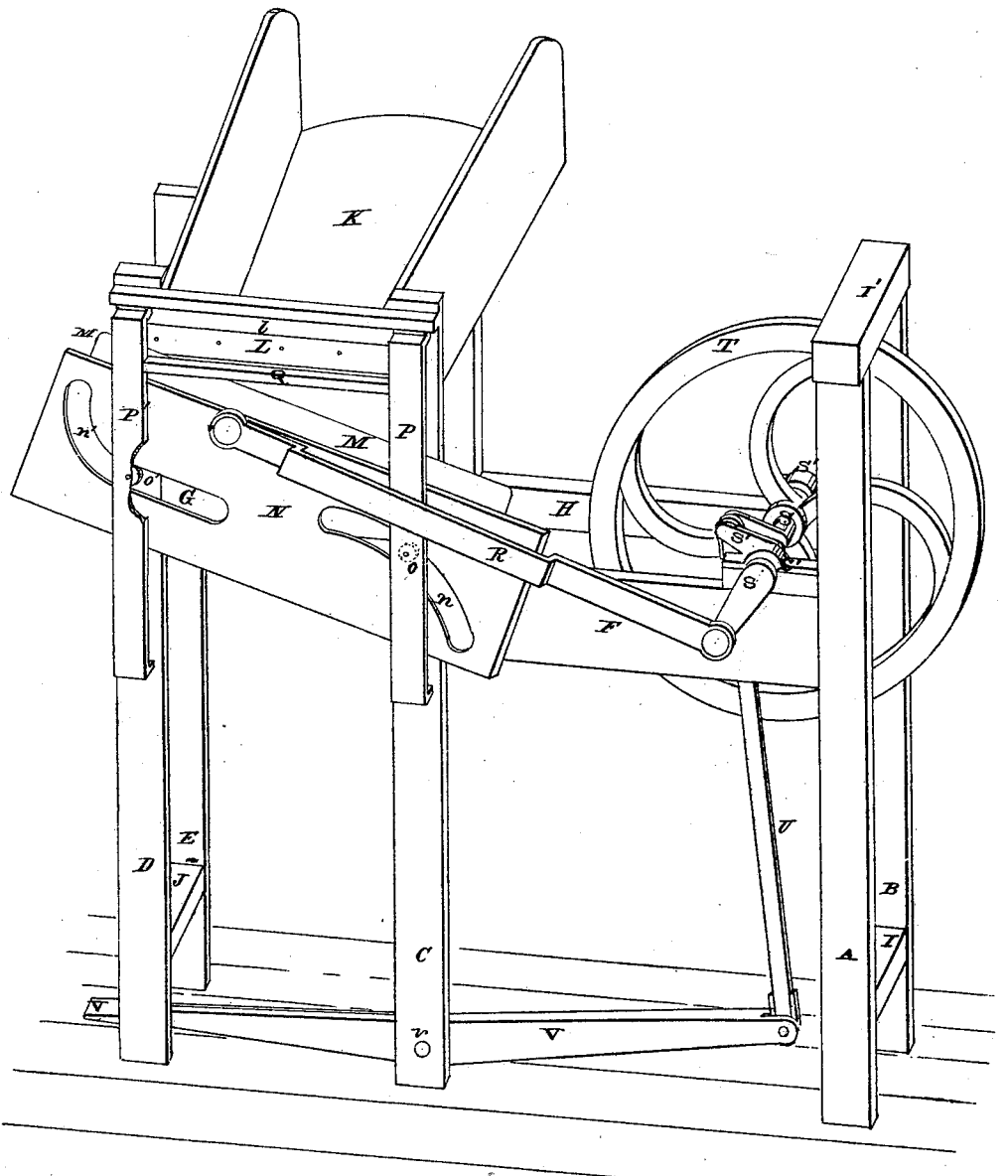

JOHN CRILEY, OF SHILOH HILL, AND WHITNEY GILBREATH, OF ROCKWOOD, ILLINOIS.

Letters Patent No. 111,819, dated February 14, 1871.

IMPROVEMENT IN FEED-CUTTERS.

The Schedule referred to in these Letters Patent and making part of the same.

We, JOHN CRILEY, of Shiloh Hill, and WHITNEY GILBREATH, of Rockwood, both in the county of Randolph and State of Illinois, have invented a certain new and Useful Feed-Cutter, of which the following is a specification.

Nature and Object of the Invention.

Our invention relates—

First, to the means for giving a combined rocking and draw-cut motion to the moving knife, which is associated with a fixed knife; and Second, to the general arrangement and combination of the parts of the machine which is intended to cut into chaff any long feed for horses or cattle, such as corn-stalks, hay, straw, or sheaf-grain, dry or green.

Description of the Drawing.

The drawing is a perspective view of our improved feed-cutter, a portion of one of the guide-straps being broken away to show one of the friction-wheels upon which the lower knife is carried.

General Description.

A B C D E are the supporting legs, connected by tie-bars F G H I I' J.

K is the box for reception of the material to be cut.

L is a knife attached to a cross-bar, $l$, above the mouth of the box.

M is a knife attached to the upper part of a board or plate, N, having curved slots, $n$ $n'$.

O O' are anti-friction-wheels journaled in the frame and in the guide-straps P P' of the knife-plate or board N.

Q is a bar connecting the upper part of the guide-straps P P', the said bar serving to prevent the ends of the feed from being thrown upward by the pressure of the knife M.

Part of the strap P' is shown broken away to exhibit the anti-friction-wheel O', the wheel O being similar to that O', and fulfilling a similar purpose. Its position behind the strap P is shown by dotted lines.

Round pins may take the place of the wheels O O'.

R is a pitman connecting the knife-plate N with the crank $s$ of the shaft S.

The shaft S carries a balance-wheel, T, and has a crank, $s'$, which is connected by a pitman, U, to one end of the treadle V, pivoted at $r$ to the leg C.

The shaft S turns in boxes S', secured to the tie-bars F H.

The operation of the machine is as follows:

The feed is placed in the box and the machine set in motion by means of the treadle.

The end of the knife nearest to the operator is first raised, and when it is sufficiently pressed against the feed the sliding motion of the knife increases and the other end commences to rise, so that a rocking motion is given to the knife, and it is made to commence cutting at one side of the mouth and to cut across to the other side, instead of cutting simultaneously from side to side, as is usual.

In some cutters the knives have a circular or vertical motion, and their edges are inclined to the upper and lower margins of the mouth, so as to commence cutting at one side and to progress to the other; but these knives receive no rocking motion, and differ in that respect from ours.

The peculiar motion of the lower knife and the association therewith of the upper knife causes the cut to be made in the manner of a draw-shears, and it has been found to cut any feed, from corn-stalks to green oats, with great ease.

The bar Q is situated outside of the knives, and prevents the ends of the feed from being raised and escaping from the knife, and forcing the latter outward from the mouth of the box.

The knife M might be made to rise first at the opposite end to the one described, or the knives may be reversed, the fixed knife being placed below and the moving knife above; but the arrangement shown is that preferred by us.

No device is shown for moving forward the feed as it is cut, and this may be done by the hand, or by any of the well-known appliances therefor, such as a small rake hung to the box and operated by hand.

Claims.

We claim as our invention—

1. The knife-plate or board N, having curved slots $n$ $n'$, and carried on two pins or anti-friction-rollers O O', substantially as and for the purpose described.

2. The combination and arrangement of the rocking draw-knife M N $n$ $n'$ and fixed knife L, substantially as described.

3. The combination and arrangement of the treadle V, pitman U R, cranks $s$ $s'$, shaft S, balance-wheel T, knives M, and slotted plate or board N, $n$ $n'$, and L, as described.

In testimony of which invention we have hereunto set our hands.

JOHN CRILEY.
WHITNEY GILBREATH.

Witnesses:
H. M. VAN METER,
CYRUS CRILEY.